Nov. 9, 1954 W. L. REID ET AL 2,693,713
TRANSMISSION CONTROL
Filed June 18, 1949 4 Sheets-Sheet 1
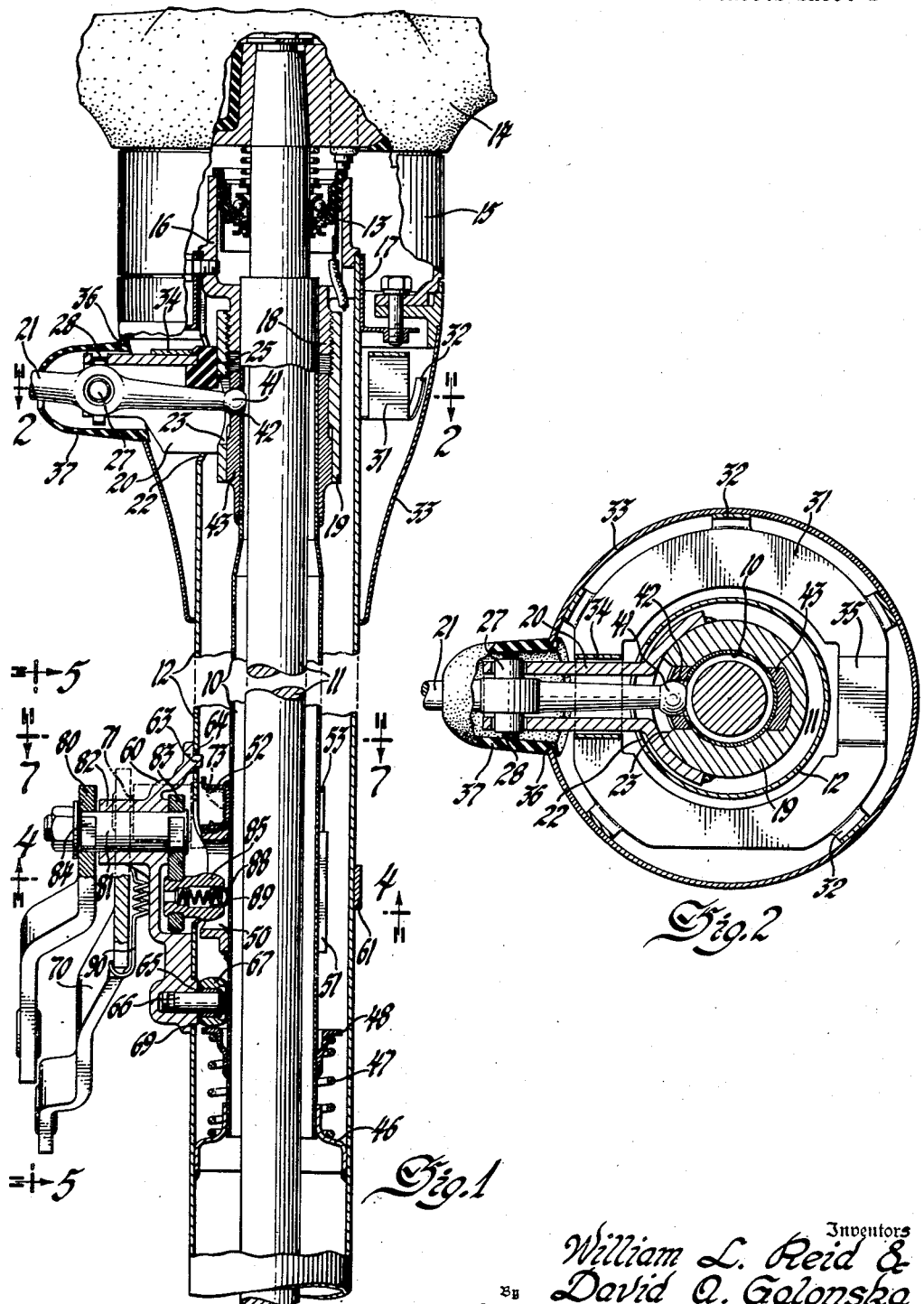
Inventors
William L. Reid &
David A. Galonska
By
Spencer, Willits, Helwig & Baillio
Attorneys Nov. 9, 1954  W. L. REID ET AL  2,693,713
TRANSMISSION CONTROL
Filed June 18, 1949  4 Sheets-Sheet 2

Inventors
William L. Reid &
David O. Galonska
By
Spencer Willits, Delury & Baillie
Attorneys

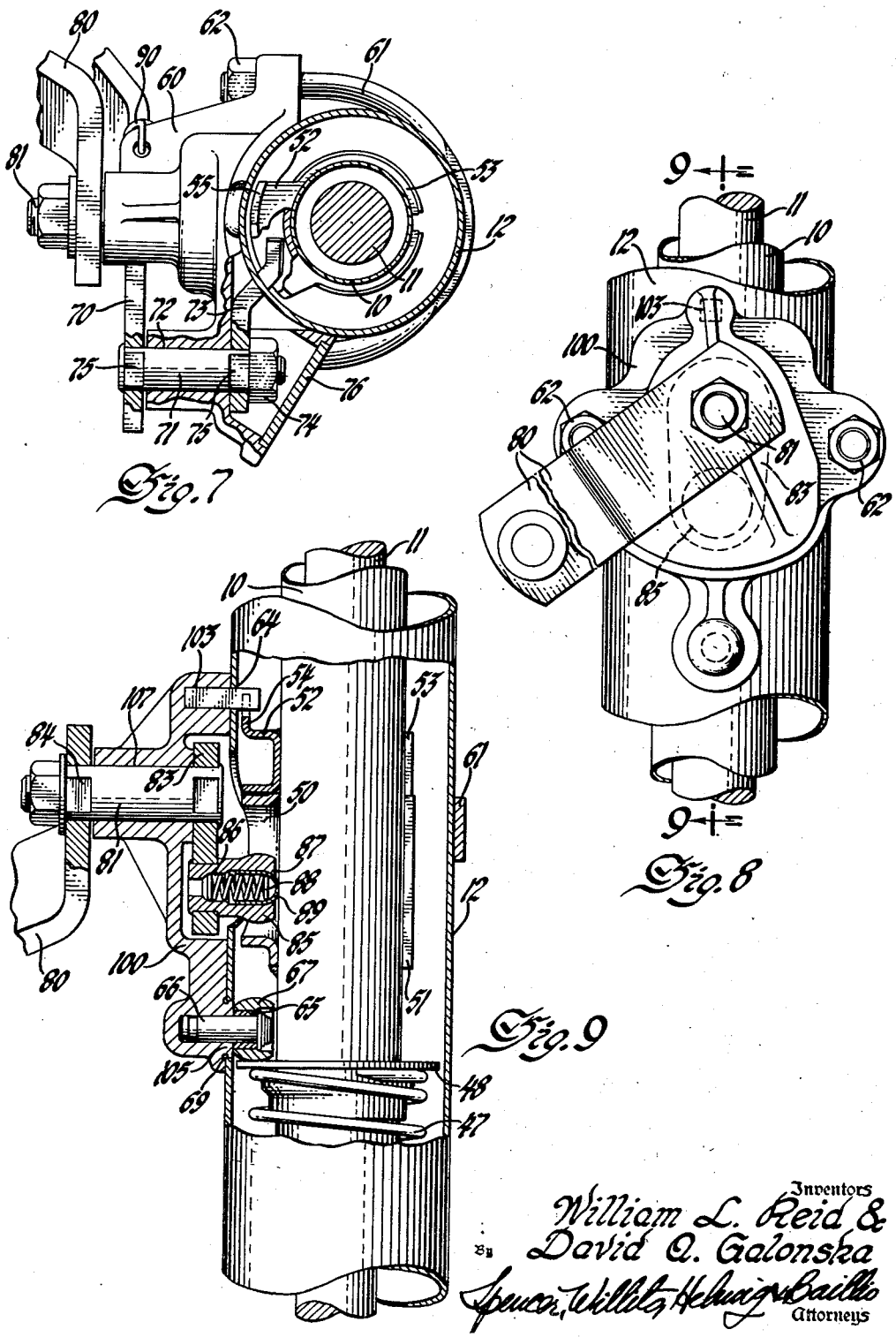

Nov. 9, 1954  W. L. REID ET AL  2,693,713
TRANSMISSION CONTROL
Filed June 18, 1949  4 Sheets-Sheet 4
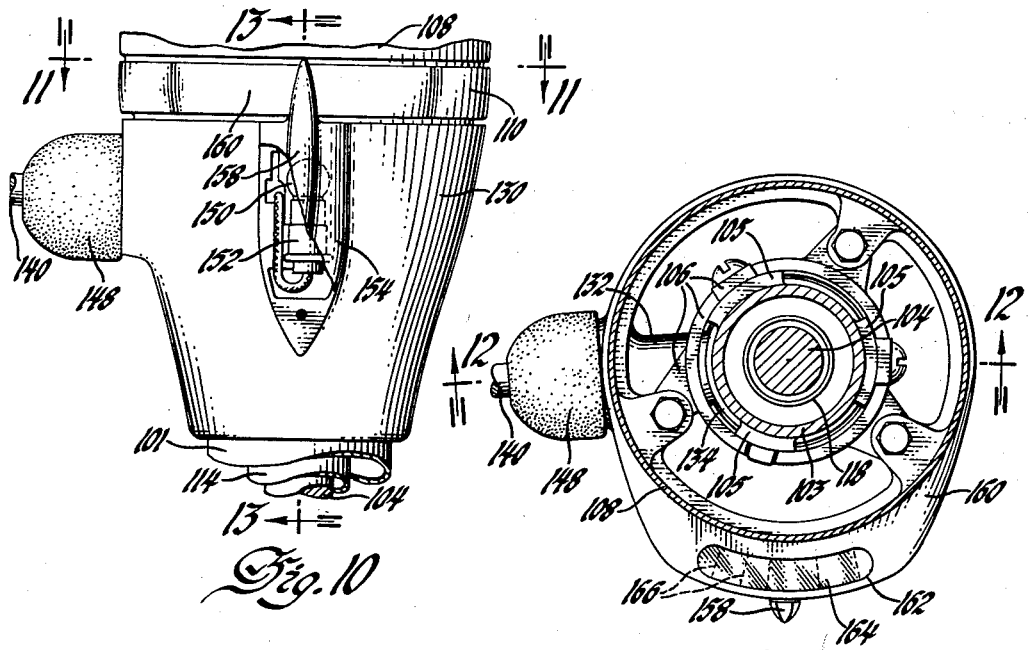
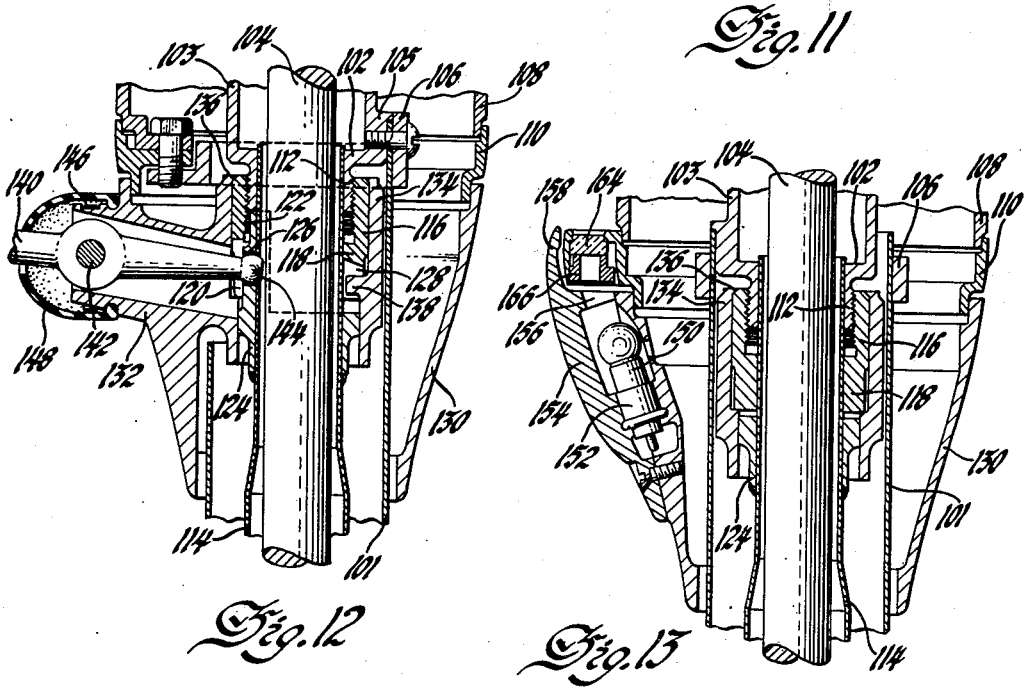
Inventors
William L. Reid &
David A. Galonska
By
Spencer, Willis, Helwig & Baillio
Attorneys

United States Patent Office 2,693,713
Patented Nov. 9, 1954

2,693,713

TRANSMISSION CONTROL

William L. Reid, Whittier, Calif., and David A. Galonska, Saginaw, Mich., assignors to General Motors Corporation, Detroit, Mich., a corporation of Delaware Application June 18, 1949, Serial No. 100,006

20 Claims. (Cl. 74—484)

This invention relates to an improved transmission control linkage mounted on the steering column.

This remote control linkage for controlling both the synchromesh transmissions and the automatic transmissions is mounted on the steering column. The hand lever extends horizontally just below the steering wheel and is pivotally mounted on a bowl assembly. The bowl assembly is rotatably mounted concentric with and outside of the steering column. The shift or control tube is mounted inside the steering column and is operatively engaged by the hand lever. Axial movement of the hand lever about the pivot on the bowl will reciprocate the shift tube, while rotary movement of the hand lever about the steering column axis will rotate the bowl assembly and shift tube.

Adjacent the lower end of the steering column a longitudinal and a transverse channel guide are fixed to the shift tube. Offset bell crank levers, with one crank of each lever engaging a guide inside the steering column and the other crank extending outside the steering column, transfer the motion to the transmission. Only the longitudinal guide is employed to actuate a bell crank lever for the automatic transmissions, while both guides are employed for the synchromesh transmission.

The object of this invention is to provide an improved connection between a handle operated lever mounted adjacent the steering wheel to reciprocate and rotate a control shaft mounted concentrically with the steering column and improved cams to selectively transfer the reciprocating movement to one lever and the rotating movement to another lever.

Another object of the invention is to provide a control mechanism easily interchangeable for actuating either one control lever for an automatic transmission or two control levers for a synchromesh transmission.

Other objects and advantages of the invention will be apparent from the following drawings and detailed description of the preferred embodiment.

In the drawings—

Figure 1 is a partial elevation of the steering column and transmission control with parts broken away.

Figure 2 is an enlarged section on the line 2—2 of Figure 1 showing the hand lever connection.

Figure 7 is an enlarged partial section on the line 7—7 of Figure 1.

Figure 8 is a side elevation of a modification having one transmission control lever.

Figure 9 is a partial section on the line 9—9 of Figure 8.

Figure 10 is a partial elevation view with parts broken away of a modified gearshift control with an indicator.

Figure 11 is a section of Figure 10 on the line 11—11.

Figure 12 is a section of Figure 11 on the line 12—12.

Figure 13 is a section on the line 13—13 of Figure 10 of the modified gearshift control with the indicator in section.

Figure 3:
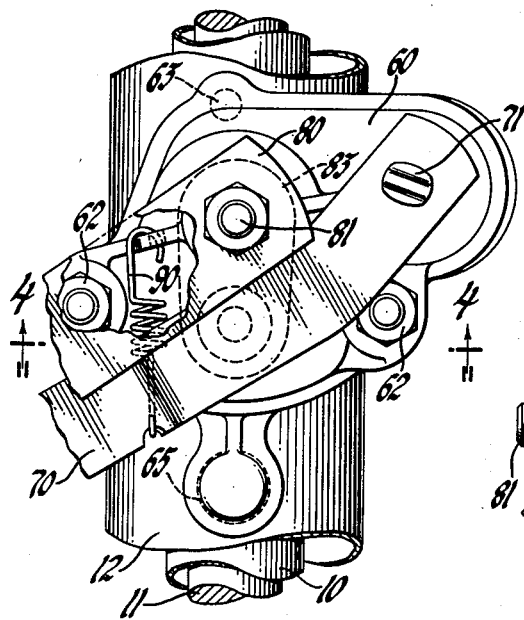
Figure 3 is an enlarged partial side elevation of the transmission operating lever of Figure 1.

The transmission control or shift tube 10 is mounted concentrically about the steering shaft 11 and within the steering or support column 12. At the upper end of the steering shaft the conventional steering wheel 14 is attached. A bracket 16 is attached by bolts to the steering column and supports the bearing 13 which rotatably supports the steering shaft. A two-part housing 15 is attached by bolts to the support 17 which is bolted to the steering column 12 in order to enclose the space between the bowl 33 and the steering wheel 14. An extension or sleeve 18 on the lower side of the bracket 16 has external threads for rotatably supporting the hub 19, shift lever fulcrum 20 and bowl 33.

A hub or guide sleeve 19 having internal threads engaging the threads on extension 18 to provide a rotatable support provides a mounting for the fulcrum element 20 for the hand lever 21. The fulcrum element 20 is of channel shape with the web terminating in spaced relation to the sleeve 19. Both flanges of the channel-shaped fulcrum element have extensions shaped to engage the outside surface of the sleeve 19 on each side of an aperture 23 and are welded or otherwise secured to the sleeve. A rubber bumper 25 is fitted in the space between the web of the fulcrum element and the sleeve 19. The fulcrum extends through a slot or aperture 22 in the steering column having a lower wide portion to allow the fulcrum to swing and a narrow portion extending to the top to allow the hub 19, fulcrum 20 and bowl 33 to be inserted as a unit.

The operating lever 21 which, though not shown, extends outwardly to a position adjacent the rim of the wheel 14 in the conventional manner. The flanges of the fulcrum element 20 have apertures near the end to receive the fulcrum pin 27 which extends through an aperture in the lever 21 located between the ends. The retainer ring 28 fits in a groove on the fulcrum element to retain it in position, and the ends of the ring engage the ends of pin 27 to prevent the pin from falling out.

A spider bracket 31 having a central aperture surrounds the steering column 12 and outwardly directed tongs 32 which are spot-welded to the bowl housing 33 supports the bowl on the guide sleeve and fulcrum assembly. The spider 31 has an offset portion 34 which fits over and is secured to the fulcrum element. To facilitate manufacturing this stamped part, a similar offset 35 is formed on the other side of the spider. The bowl 33 is suitably apertured at 36 to allow the fulcrum element and handle to pass through. A rubber boot 37 fits over the handle and has a groove at the end fitting the perimeter of the aperture 36.

The sleeve 19 has an aperture 23 which allows the bulbous end 41 of the handle 21 to fit into a hole 42 in the reinforcing ring 43 secured to the top end of the central control tube 10. The bulbous end 41 fits in hole 42 with sufficient clearance to allow transverse sliding movement but no relative axial movement of the handle and the control tube.

A combined guide bushing and spring support 46 is secured by welding to the steering column at the lower end and guides tube 10. The coil spring 47 is supported on the bushing 46 and engages the stop 48 which is secured by welding to the control tube to resiliently hold the tube in the upper position.

Above the stop 48 a longitudinal guide 50 provides a longitudinal guide slot on the control tube. Formed integrally with the guide is a sleeve 51 split at the opposite side and secured to the tube by suitable means such as spot welds. The transverse guide 52 is positioned above the longitudinal channel guide 50 and is formed from a split sleeve 53 by bending side portions upwardly to form the channel guide portion 52. This guide is also secured to the control tube by welding the split sleeve thereto. The guide 52 has an upwardly extending flange 54 (Fig. 5) with a cut-out portion 55 for aligning the transverse guide 52 with the longitudinal guide 50.

Figure 4:
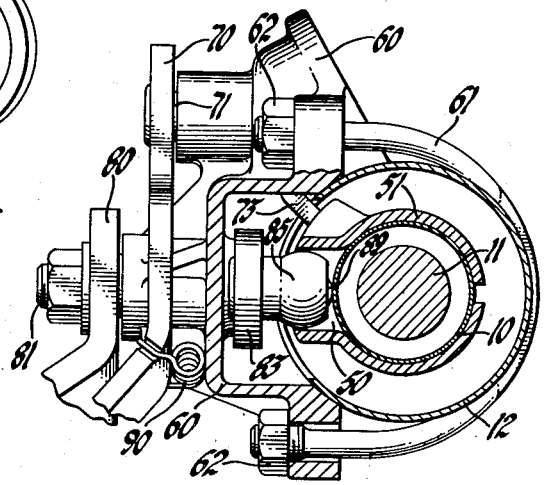
Figure 4 is an enlarged partial section on the line 4—4 of Figures 1 and 3.

Adjacent the longitudinal guide 50 and the transverse guide 52 the steering column 12 is apertured to allow the offset bell crank levers mounted in housing 60 to enter the guides. As best shown in Figures 3 and 4, the housing 60 has apertures on each side, which receive the ends of the U-shaped bolt 61 which extends around the steering column 12. A nut 62 on each end of the U-bolt fastens the housing. At the upper side of the housing an integral projection 63 or pin press-fitted in a bore extends into aperture 64 in the wall of the steering column to position the housing. At the lower side of the housing the round bushing or projection 65 fits in aperture 69 in the steering column. The housing 60 is held against lateral sliding by the projections 63 and 65, and clamped to the steering column by U-bolt 61.

In the center of the bushing or projection 65 is a bore to receive the pin 66. The pin 66 extends into the steering column and has a roller 67 which may have a rubber rim smaller than aperture 69 suitably secured on the pin. An oil impregnated powdered metal bearing may be used between the roller and pin. The roller 67 bears against the stop 48 in order to limit the upward movement of the control tube 10, performing the same function as bumper 25 for which it may be substituted.

The details of the housing 60 and the selector and shift levers are shown in Figures 1 and 3 to 7. The selector or cross-shift lever 70 is attached to the outer end of shaft 71 pivoted in bore 72 in the housing 60. The transverse cam lever 73 is attached to the inner end of shaft 71 by detachable means such as nut 74. Suitable means, such as flats 75 on each end of shaft 71, prevent movement of levers 70 and 73 relative to the shaft. The housing 60 has an opening provided with closure 76 to provide access to the attaching nut 74. The lever 73 has a rounded end 77 which rests in the transverse guide channel 52.

The shift lever 80 is attached to the outer end of shaft 81 journalled in bore 82 in the housing 60. A lever 83 is attached at the inner end of shaft 81. Suitable means, such as flats 84, prevent relative rotation of the shaft and levers. At the free end of lever 83 a ball stud 85 is attached by suitable means, such as inserting in an aperture in the lever and riveting the stud thereto. The stud has a shouldered bore in which is located an anti-rattle spring 88, which has a spring cap 89 pressing against the central tube. As best shown in Figure 9, the bore has adjacent a shoulder an inner reduced portion 86 which tightly grips the inner end of the spring. The spring cap 89 which resiliently engages the tube 10 is slidably fitted in the larger portion 87 of the bore may be retained by an outer shoulder. The ball stud 85 slides in the longitudinal guide channel 50. A tension spring 90 connected between lever 70 and the housing is employed to overcome the cross-shift drag which is inherent in the transmission and serves as a booster to coil spring 47 as well as an anti-rattle to the cross-shift lever 70 and its associated linkage.

Figure 5:
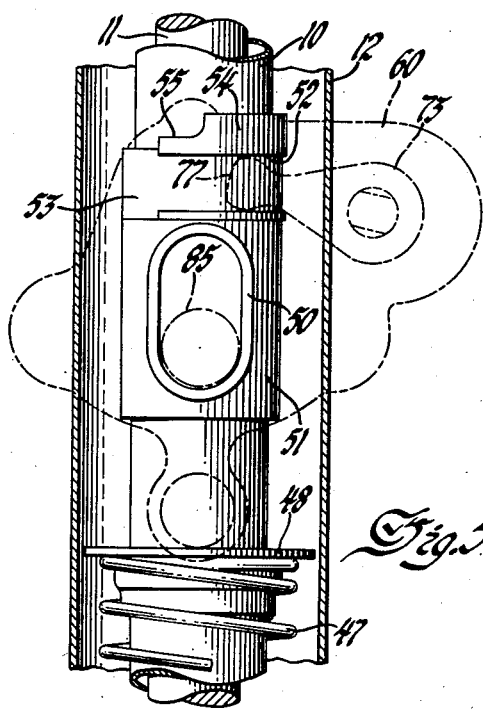
Figure 5 is an enlarged detail partial section looking in the direction of the arrows 5—5 of Figure 1 with the lever housing shown in dash and dotted lines.
Figure 6:
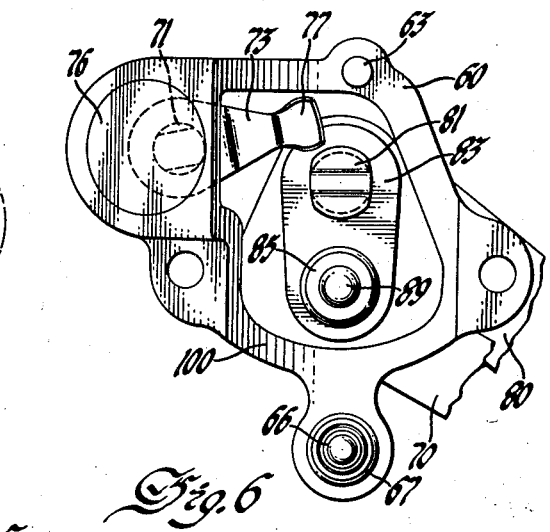
Figure 6 is a view of the interior of the lever housing shown in dash and dotted lines in Figure 5.

The relative position of the transverse channel 52 and the longitudinal channel 50 are clearly shown in Figure 5. In addition, this figure shows in dot-and-dash lines the relative position of the housing 60 when in position. Figure 6 shows the face of the housing 60 normally in contact with the steering column and the neutral position of the levers 73 and 83.

Figures 8 and 9 show a modified housing and control lever to mount on this steering column 12 for use with a single lever controlled automatic transmission, such as shown in Patent 2,204,872 to Thompson. With this automatic transmission the same steering shaft 11, steering column 12 and control tube 10 are used. However, the housing 60 is not used, but the housing 100 is fitted over column 12 and has apertures to receive U-bolt 61. Nuts 62 on the U-bolt secure and clamp housing 100 to the steering column in the same manner as housing 60. At the top end of the housing a pin 103 is tightly fitted in a bore. The pin fits aperture 64 in the steering column. At the lower end of housing 100 a projection or bushing 105 extends into aperture 69 in the steering column. Thus this housing is secured or located at both the top and bottom in the same manner as housing 60. It will be noted that the pin 103 extends further into the steering column than pin 63. The pin 103 cooperates with flange 54 to prevent rotative movement of the control tube to the reverse position without lifting the handle to depress the tube and flange 54 to clear pin 103. The flange 54 is cut out at 55 to allow movement without depressing the tube for other transmission control positions. The housing 100 is suitably bored preferably at the center of the projection 105 to receive the pin 66 which rotatably supports roller 67.

Since the selector lever is not required with the automatic transmission, the housing 100 has one boss for the bore 107 which is the same as bore 82 of housing 60. Thus the shift lever 80, shaft 81 and lever 83 of the above described control for a synchromesh transmission may be used.

A modified connection between the hand lever and the upper end of the shift tube, which has an illuminated indicator to show the angular position of the shift tube, is shown in Figures 10 to 13. This structure, though generally similar to the other form of the invention, consists predominately of die-cast parts. The control linkage is mounted on the steering column 101 by a supporting bracket 102 having an upwardly extending cylindrical portion 103 which supports a bearing for the upper end of the steering shaft 104. The cylindrical portion of bracket 102 has a plurality of circumferentially spaced bosses 105 which seat inside the steering column 101. An annular support 106 having spaced ears is secured to the stationary steering column 101 by screws which go through the vertical ears of support 106 and steering column 101 and anchor in the bracket 102. A fixed housing to enclose the steering wheel hub beneath the steering wheel is supported on the horizontal ears of support 106. This housing consists of an upper part 108 and a lower part 110 both having ears which are secured by screws to the ears of support 106.

The lower portion of support 102 has a cylindrical guide 112 with a smooth internal surface to provide a guide bearing for the shift or control tube 114. The outer surface of guide 112 is threaded to receive and rotatably support the threaded hub bearing 116. The hub has a guide portion 118 at the lower end having a reduced internal diameter to provide another guide for the upper end of the shift tube 114. The guide portion 118 of the hub has a slot 120 which slidably but non-rotatably receives a tongue 122 extending upwardly from the reinforcing ring 124 welded on the upper end of the shift tube. The tongue 122 and the shift tube 114 are apertured at 126 to receive the end of the shift handle as described below. The guide portion 118 of the hub has a keyway 128 disposed diametrically opposite to the slot 120.

A bowl assembly 130 having a generally frusto-conical shape to provide a tapered housing between the housing 110 and the steering column 101 is supported on the hub bearing 116. The bowl 130 consisting of the outer frusto-conical bowl portion, a transversely extending tube or fulcrum portion 132 and a central or hub sleeve portion 134 are made from a one-piece die-casting. The tube 132 extends through an aperture in the steering column and provides the only connection between the bowl 130 and the sleeve 134 and also provides a fulcrum or pivot for lever 140 as explained below. The sleeve 134 has an internal shoulder on which hub 116 seats. The upper edge of the sleeve 134 is spun over at 136 to secure the hub 116 in the sleeve. A key 138 preferably made integral with the sleeve 134 fits into the keyway 128 to prevent rotation of the sleeve and bowl 130 about the hub. The reinforcing ring 124 has an enlarged portion fitting within the lower portion of sleeve 134.

A conventional gearshift lever 140 has a handle portion (not shown) extending out to the steering wheel rim and is pivoted nearer its inner end by a pin 142 to the outer end of the tube 132. The inner end of the lever 140 has a ball 144 fitting into an aperture 126 in the shift tube and reinforcing ring to raise and lower the shift tube. A spring steel ring 146 fitting into a groove around the top of tube 132 engages both ends of pin 142 to hold it in place. The tube also has an external annular groove to receive the rubber boot 148.

If it is desired to provide this gearshift control with an illuminated indicator, the outer surface of the bowl 130 is provided with a cavity 150 spaced about 90° from the lever 140. A socket and bulb 152 are seated in this cavity and held in place by a lamp closure 154 secured to the bowl in order to enclose and clamp the socket and bulb. The closure 154 has an aperture 156 at the upper end to provide a thin beam of light for the indicator. A pointer 158 also extends upwardly to provide an indication independently of the light.

The lower housing part 110 is also modified to provide for the indicator. As shown in Figure 11 one portion 160 is extended and provided with an aperture 162 covered with a transparent window 164. A divided member 166 is positioned below the glass. This member may have indicia in silhouette form so that they are visible when the light is moved behind them.

The operating lever 21 and the connection between the lever and the control tube 10 is structurally the same for both the synchromesh transmission and the automatic transmission. When the hand lever 21 is moved down it pivots on the fulcrum pin 27 and ball end 41 pushes the control tube 10 up. Similarly upward movement of the hand lever 21 will move the control tube 10 down. The upward movement of the tube 10 is continually urged by spring 47 and limited by stop 48 abutting roller 67 or by lever 21 abutting rubber stop 25. Since the lever 21 and fulcrum pin 27 are mounted on support 20, which is rotatably mounted on the steering column by means of sleeve 19 and bracket 16, the whole assembly may be rotated. Thus rotation of the lever 21 will rotate the control tube 10.

In the operation of a synchromesh transmission the reciprocating and rotating movement of the control tube 10 selectively operates a selector lever 70 and a shift lever 80. When the control tube is reciprocated the transverse guide 52 will rotate the transverse cam lever 73 which is connected through shaft 71 to the selector lever 70 which is suitably connected to the transmission selector mechanism. The reciprocating movement of the tube 10 will not move the shift lever 80 as the ball stud 85 merely slides in the longitudinal guide 50. When the control tube is rotated the longitudinal guide 50 moves the ball stud 85 transversely to rotate or actuate the longitudinal cam lever 83, shaft 81 and shift lever 80 which is connected to the transmission shift mechanism. During rotative movement of the tube 10 the rounded end 77 of the transverse cam lever 73 slides in transverse guide 52 and the selector lever 70 is not moved.

In operating the automatic transmission which does not have the selector control, the same handle 21 and connection to the control tube 10 is employed. The rotary motion of the handle 21 and control tube 10 will move the shift lever 80 to the desired positions. In order to prevent accidental movement into a driving position, such as reverse, the pin 103 abuts the flange 54 and prevents rotation of the control tube to reverse position. Thus it is necessary to lift the handle 21 and depress the control tube against spring 47 to move flange 54 below pin 103 to allow rotation of the control tube to reverse position. This safety feature may be applied to all driving positions. Thus it would be necessary to lift the lever slightly to move it into the driving positions with some additional upward movement required to shift to reverse.

In the modified form shown in Figures 10 to 13 the movement of the hand lever 140 controls the shift tube 114 in the same way. Rotation of the lever 140 rotates the bowl assembly 130 and shift tube 114, while upward movement of the lever depresses the shift tube. For the automatic transmissions the pointer 158 and light 152 mounted on the rotatable bowl points to or illuminates the fixed indicia scale 166 on the fixed position of the hub housing 110.

The above examples are illustrative of the invention. Various modifications may be made within the scope of the appended claims.

We claim:

1. In a transmission control mechanism, a support, a control tube reciprocally and rotatably mounted on said support, a fulcrum rotatably mounted concentric with said tube on said support, key and slot means on said fulcrum and said tube to prevent rotary motion and allow reciprocal motion between said fulcrum and tube, and means on said fulcrum to reciprocate said tube.

2. In a transmission control mechanism mounted on a steering column having an aperture, a support sleeve within said column and supported by said column, a shift tube guided within said support sleeve, a hub sleeve rotatably supported on said support sleeve, a fulcrum having top and side walls extending through said aperture, a hand lever pivoted to said fulcrum between the side walls, a reinforcing ring secured to said shift tube, cooperating lands and grooves on said ring and hub sleeve to prevent rotation of said tube relative to said hub sleeve, the outer portion of said ring being slidably guided in said hub sleeve, a hole in said ring and tube to receive said hand lever to reciprocate said tube, a longitudinal guide channel on the lower end of said tube, a cam pivoted inside said column and having an axially extending portion entering said channel, and a shift lever pivoted outside said column and connected to said cam.

3. In a transmission control mechanism mounted on a column having an aperture, a support sleeve mounted on said column, a shift tube rotatably and slidably mounted in said sleeve, an integral bowl assembly having an inner hub portion rotatably supported on said support sleeve, a tubular fulcrum portion extending through said aperture in the column, a bowl portion supported on said fulcrum portion and surrounding said column, a hand lever pivoted in said fulcrum portion, an aperture in said tube receiving the end of said lever, a lower guide at the other end of the column to support said tube, and means adjacent said guide to transfer the rotary movement of said tube to actuate a lever pivoted on said column.

4. A transmission control mechanism mounted on a steering column, a support sleeve mounted inside said steering column, a guide sleeve supported on said support sleeve for rotative movement, an aperture in said steering column and said guide sleeve, a fulcrum element attached to said guide sleeve and extending through said aperture, a handle pivoted on said fulcrum element and extending through said column and guide sleeve, a control tube slidably mounted in said guide sleeve, a bore in said tube receiving the end of said handle, a longitudinal channel on said tube at the remote end, an opening in said column over said channel, a housing covering said opening, a shift shaft and lever on said housing, a shift cam fixed to said shift shaft and sliding in said longitudinal channel, and an anti-rattle spring in said shift cam engaging said tube.

5. A transmission control mechanism mounted on a steering column, a control tube rotatably and reciprocally mounted on said steering column, a fulcrum pivotally mounted on said column, a handle pivoted on said fulcrum and connected to said tube to rotate and reciprocate said tube, a longitudinal channel mounted on the other end of said tube, an aperture in said column over said channel, a housing on said column, a shift cam slidably mounted in said longitudinal channel and fixed at the other end to a shift shaft mounted in said housing, and a shift lever fixed to said shift shaft outside said housing.

6. A transmission control mechanism mounted on a steering column, an externally threaded support sleeve mounted inside said steering column, an internally threaded guide sleeve threaded on said support sleeve for rotative movement, an aperture in said steering column and said guide sleeve, a fulcrum element attached to said guide sleeve and extending through said aperture, a handle pivoted on said fulcrum element and extending through said column and guide sleeve, a control tube slidably mounted in said guide sleeve, a bore in said tube receiving the end of said handle, a longitudinal channel and a transverse channel on said tube at the remote end, an opening in said column over said channels, a housing covering said opening, a selector shaft and lever on said housing, a selector cam fixed to said shaft and in said transverse channel, a shift shaft and lever on said housing, a shift cam fixed to said shift shaft and sliding in said longitudinal channel, and an anti-rattle spring in said shift cam engaging said tube.

7. A transmission control mechanism mounted on a steering column, an externally threaded support sleeve mounted inside said steering column, an internally threaded guide sleeve threaded on said support sleeve for rotative movement, an aperture in said steering column and said guide sleeve, a fulcrum element attached to said guide sleeve and extending through said aperture in the column, a handle pivoted on said handle fulcrum element and extending through said aperture in the column and guide sleeve, a control tube slidably mounted in said guide sleeve, a bore in said tube receiving the end of the handle to reciprocate and rotate said control tube, a housing mounted on said column, a selector lever pivotally mounted on said housing, means to move the selector lever in response to reciprocating movement of said tube, a shift lever mounted on said housing, and means to move said shift lever in response to rotating movement of said tube.

8. A transmission control mechanism mounted on a steering column, an externally threaded support sleeve mounted inside said steering column, an internally threaded guide sleeve threaded on said support sleeve for rotative movement, an aperture in said steering column and said guide sleeve, a fulcrum element attached to said guide sleeve and extending through said aperture, a handle pivoted on said fulcrum element and extending through said column and guide sleeve, a control tube slidably mounted in said guide sleeve, a reinforcing ring attached to said tube and positioned inside said guide sleeve, cooperating grooves and lands on said ring and sleeve to prevent rotation, a bore in said tube and a reinforcing ring receiving the end of said handle, a longitudinal channel and a transverse channel on said tube at the remote end, an opening in said column over said channels, a housing covering said opening, a selector shaft and lever on said housing, a selector cam fixed to said shaft and in said transverse channel, a shift shaft and lever on said housing, a shift cam fixed to said shift shaft and sliding in said longitudinal channel, and an anti-rattle spring in said shift cam engaging said tube.

9. A transmission control mechanism mounted on a steering column, an externally threaded support sleeve mounted inside said steering column, an externally threaded guide sleeve threaded on said support sleeve for rotative movement, an aperture in said steering column and said guide sleeve, a fulcrum element attached to said guide sleeve and extending through said aperture in the column, a handle pivoted on said fulcrum element and extending through said apertures in the column and guide sleeve, a control tube slidably mounted in said guide sleeve, a reinforcing ring secured to said control tube within said sleeve, cooperating lands on said guide and ring to prevent rotation, a bore in said tube and reinforcing ring receiving the end of the handle to reciprocate and rotate said control tube, a housing mounted on said column, a selector lever pivotally mounted on said housing, means to move the selector lever in response to reciprocating movement of said tube, a shift lever mounted on said housing, and means to move said shift lever in response to rotating movement of said tube.

10. A transmission control mechanism mounted on a steering column, a control tube rotatively and reciprocally mounted on said steering column, a fulcrum pivotally mounted on said column, a handle pivoted on said fulcrum and connected to said tube to rotate and reciprocate said tube, a transverse channel and a longitudinal channel mounted on the other end of said tube, an aperture in said column over said channels, a housing on said column, a selector cam lever slidably mounted in said transverse channel and fixed to a selector shaft mounted in said housing, a selector lever fixed to said shaft outside the housing, a shift cam slidably mounted in said longitudinal channel and fixed at the other end to a shift shaft mounted in said housing, and a shift lever fixed to said shift shaft outside said housing.

11. A transmission control mechanism mounted on a steering column, a control tube rotatively and reciprocally mounted on said steering column, a fulcrum pivotally mounted on said column, a handle pivoted on said fulcrum and connected to said tube to rotate and reciprocate said tube, a transverse channel and a longitudinal channel mounted on the other end of said tube, an aperture in said column over said channels, a housing on said column, a selector cam lever slidably mounted in said transverse channel and fixed to a selector shaft mounted in said housing, a selector lever fixed to said shaft outside the housing, a shift cam having an offset bulbous end portion slidably mounted in said longitudinal channel, a spring pressed anti-rattle shoe mounted in said bulbous end and engaging said tube, and said shift cam fixed at the other end to a shift shaft mounted in said housing, and a shift lever fixed to said shift shaft outside said housing.

12. In a transmission control mechanism, a control tube, a channel fixed to said tube, a shaft pivoted radially of said tube, a cam lever fixed to said shaft, a stud fixed to said lever and extending into said channel, a longitudinal bore in said stud, and a spring in said bore, one end engaging an abutment in said bore, the other end bearing on said tube to prevent rattles.

13. In a transmission control mechanism, a control tube, handle means for reciprocating and rotating said tube, a selector lever, means having said selector lever responsive to reciprocating movement of said tube, a shift lever, means moving said shift lever responsive to rotative movement of said tube, an annular stop on said tube, a roller stop abutment engaging said annular stop, and spring means maintaining said annular stop in normal contact with said roller stop.

14. In a transmission control mechanism, a control tube, a channel fixed to said tube, a shaft pivoted radially of said tube, a cam lever fixed to said shaft, a stud fixed to said lever and extending into said channel, a longitudinal bore in said stud, and a spring and shoe in said bore, one end of said spring engaging an abutment in said bore, the other end bearing on said shoe to resiliently maintain it in contact with said tube to prevent rattles.

15. In a transmission control mechanism, a steering column, a control tube concentrically within said steering column, handle means for reciprocating and rotating said tube, a selector lever, means moving said selector lever responsive to reciprocating movement of said tube, a shift lever, means moving said shift lever responsive to rotative movement of said tube, an annular stop on said tube, a roller stop abutment on said steering column engaging said annular stop, an annular guide having a flange at the inner and outer edge, the outer flange being secured to said column, the inner flange guiding said tube, and a spring engaging said annular guide and stop to maintain said annular stop in normal contact with said roller stop.

16. In a remote control mechanism mounted on a column having an aperture, a support mounted on said column, a shift tube rotatably and slidably mounted in said support, a unitary bowl assembly having an inner hub sleeve portion rotatably supported on said support, a fulcrum portion extending through said aperture in the column, a bowl portion supported on said fulcrum portion and surrounding said column, a hand lever pivoted in said fulcrum portion, an aperture in said shift tube receiving the end of said lever, a lower guide at the other end of the column to support said tube, and means adjacent said guide to transfer the rotary movement of said tube to actuate the control mechanism.

17. In a remote control mechanism mounted on a column, a support mounted inside said column, a guide supported on said support for rotative movement, an aperture in said column and said guide, a fulcrum element attached to said guide and extending through said aperture, a handle pivoted on said fulcrum element and extending through said column and guide, a control tube slidably mounted in said guide, a bore in said control tube receiving the end of said handle, a longitudinal channel on said tube at the remote end, an opening in said column over said channel, a shift shaft pivoted on said column, a shift cam fixed to said shift shaft and sliding in said longitudinal channel, and an anti-rattle spring in said shift cam engaging said tube.

18. In a remote control mechanism mounted on a column, a control tube rotatably and reciprocally mounted on said column, a fulcrum pivotally mounted on said column, a handle pivoted on said fulcrum and connected to said tube to rotate and reciprocate said tube, a longitudinal channel mounted on the other end of said tube, an aperture in said column adjacent said channel, a shift cam slidably mounted in said longitudinal channel, a shift shaft rotatably mounted on said column, and said shift cam being fixed at the other end to said shift shaft.

19. A transmission control mechanism mounted on a steering column, a support sleeve mounted inside said steering column, a guide sleeve supported on said support sleeve for rotative movement, an aperture in said steering column and said guide sleeve, a fulcrum element attached to said guide sleeve and extending through said aperture in the column, a handle pivoted on said fulcrum element and extending through said apertures in the column and guide sleeve, a control tube slidably mounted in said guide sleeve, a bore in said tube receiving the end of the handle to reciprocate and rotate said control tube, a housing mounted on said column, a shift lever mounted on said housing, and means to move said shift lever in response to rotating movement of said tube.

20. In a mechanical control mechanism, a support, a control member reciprocally and rotatably mounted on said support, a fulcrum member rotatably mounted concentrically with said control member on said support, operating means connected between said fulcrum member and said control member to reciprocate said control member, and guide means on said control member and said fulcrum member independent of said operating means located on opposite sides and transversely of said operating means in all positions of said operating means to prevent rotary motion and allow reciprocal motion between said control member and said fulcrum member to prevent lateral strain on said operating means.

References Cited in the file of this patent

UNITED STATES PATENTS

| Number | Name | Date |
|---|---|---|
| 1,425,227 | Woodward | Aug. 8, 1922 |
| 1,515,236 | Woodward | Nov. 11, 1924 |
| 1,886,695 | Kesling | Nov. 8, 1932 |
| 1,957,550 | Motter | May 8, 1934 |
| 2,242,038 | McCordic | May 13, 1941 |
| 2,277,913 | Kesling | Mar. 31, 1942 |
| 2,282,962 | Hawkins | May 12, 1942 |
| 2,284,246 | Baade | May 26, 1942 |
| 2,303,049 | Ingalls | Nov. 24, 1942 |
| 2,329,724 | Maurer | Sept. 21, 1943 |
| 2,455,179 | Jovanovich et al. | Nov. 30, 1948 |
| 2,455,204 | Wharam | Nov. 30, 1948 |